United States Patent
Ahlnas et al.

(10) Patent No.: US 9,796,899 B2
(45) Date of Patent: Oct. 24, 2017

(54) METHOD FOR PREPARING FREEZING POINT DEPRESSANT COMPOSITION

(75) Inventors: Thomas Ahlnas, Kotka (FI); Jari Kukkonen, Oulu (FI)

(73) Assignee: OY GRANULA AB LTD, Kotka (FI)

( * ) Notice: Subject to any disclaimer, the term of this patent is extended or adjusted under 35 U.S.C. 154(b) by 1093 days.

(21) Appl. No.: 12/693,109

(22) Filed: Jan. 25, 2010

(65) Prior Publication Data

US 2011/0180746 A1   Jul. 28, 2011

(51) Int. Cl.
  *C09K 5/00* (2006.01)
  *C09K 5/20* (2006.01)
  *C09K 5/04* (2006.01)
  *C09K 5/02* (2006.01)
  *C09K 3/18* (2006.01)

(52) U.S. Cl.
  CPC .............. *C09K 5/20* (2013.01); *C09K 3/185* (2013.01); *C09K 5/00* (2013.01); *C09K 5/02* (2013.01); *C09K 5/04* (2013.01)

(58) Field of Classification Search
  CPC .............. C09K 5/00; C09K 5/02; C09K 5/04
  USPC .......................... 252/75, 70, 71, 73, 76, 79
  See application file for complete search history.

(56) References Cited

U.S. PATENT DOCUMENTS

| | | | |
|---|---|---|---|
| 2,291,634 A | 8/1942 | Katzman et al. | |
| 2,311,910 A | 2/1973 | Straughn et al. | |
| 4,220,661 A * | 9/1980 | Huitson | A23L 3/3463 424/711 |
| 4,254,166 A * | 3/1981 | Glanville | C09K 3/18 106/13 |
| 6,087,303 A | 7/2000 | Walker | |
| 6,352,583 B1 | 3/2002 | Goettsche et al. | |
| 6,540,934 B2 * | 4/2003 | Sapienza et al. | 252/70 |
| 6,843,931 B2 * | 1/2005 | Sapienza | C09K 3/185 106/13 |
| 8,617,416 B1 * | 12/2013 | Yang | C09K 5/10 252/68 |
| 2003/0034478 A1 * | 2/2003 | Stanley et al. | 252/70 |
| 2004/0029754 A1 * | 2/2004 | Wenderoth et al. | 510/185 |
| 2005/0051754 A1 * | 3/2005 | Maes et al. | 252/67 |
| 2005/0124723 A1 | 6/2005 | Fritschi et al. | |
| 2009/0208767 A1 * | 8/2009 | Ahlnas | 428/537.1 |
| 2014/0070134 A1 * | 3/2014 | Woyciesjes | C09K 5/10 252/75 |
| 2014/0070135 A1 * | 3/2014 | Yang | C23F 11/08 252/75 |

FOREIGN PATENT DOCUMENTS

| | | |
|---|---|---|
| EP | 0 039 538 | 11/1981 |
| EP | 0 238 051 | 9/1987 |
| FI | 103704 | 8/1999 |
| FI | 110661 | 3/2003 |
| WO | 98/03066 | 1/1998 |
| WO | 03-006571 | 1/2003 |
| WO | 03-012001 | 2/2003 |
| WO | WO 2006/072659 A1 * | 7/2006 ............... B27K 3/36 |

\* cited by examiner

Primary Examiner — Jane L Stanley
(74) Attorney, Agent, or Firm — Berggren Inc.

(57) ABSTRACT

A method for preparing a composition with low corrosive effect and low freezing point, in which an ammonium cation source is mixed with a carboxyl anion source in an appropriate molar or weight ratio, either without a medium or by using an appropriate medium for obtaining liquid or water-soluble organic ammonium carboxylate of formula (1): $[NR^1R^2R^3R^4]^+{}_n$ $[R^5(COO)_n]^{-n}$, in which $R^1$, $R^2$, and $R^3$ are selected from hydrogen, substituted and unsubstituted 1-6 carbon alkyl, $R^4$ is a substituted or unsubstituted 1-6 carbon alkyl, $R^5$ is hydrogen, a substituted or unsubstituted 1-6 carbon hydrocarbon and n is an integral 1-6, and, thereafter, a possible solvent is added while keeping the alkali or alkali-earth metal content of the composition in a range of 0.001-30 wt-%.

18 Claims, No Drawings

METHOD FOR PREPARING FREEZING POINT DEPRESSANT COMPOSITION

FIELD OF INVENTION

The invention relates to a method of preamble of claim 1.

The invention relates also to use according to claim 12.

The invention relates to method of preparing freezing point depressant compositions which are especially adapted for applications where the biodegradation and low BOD, anti-corrosion and non-scaling as well as biostatic properties are highly required for fluids. The freezing point depressant compositions are fluids or solutions prepared by mixing solvent to said fluids. Preferably the present invention relates to the method for preparing environmentally benign freezing point depressant compositions for deicing surfaces and for preventing ice formation (anti-icing) on surfaces or within the compositions itself.

BACKGROUND OF INVENTION

Freezing point depressant compositions are used widespreadly for variety of purposes, especially for lowering the freezing point of an aqueous system so that ice cannot be formed on surfaces or within the aquous systems or for melting ice formed in those aqueous systems.

The effectiveness of the freezing point depressant compositions depends on the molar freezing point lowering effect, the number of ionic species that are made available and to the degree to which the compositions can be dispersed in the liquid phase. Water is the most common liquid phase in which the formation of ice is to be precluded or ice to be melted. Most freezing point depressant compositions are either based on salts such as sodium chloride or potassium formate or alcohols such as glycols and methanol.

Oil based hydraulic and heat transfer fluids have negative environment impact and they also form a favorable growth environment for microbes, from which there results formation of precipitates, and corrosion. The mineral and vegetable oils (bio oils) as well as biodegradable and non-toxic propylene glycol based fluids have the disadvantage that their viscosities increase to detrimentally high values at low temperatures e.g. for the most hydraulic and heat transfer oils the typical operating temperature is only −10° C. Both ethylene and propylene glycol can operate at lower temperatures, even down to −30° C., but especially in case of propylene glycol the pumping costs increase remarkably because of the poor heat and power transfer properties. The viscosity of hydraulic and metal cutting fluids should be within range of 10-50 mPas or even higher. The viscosity should not be too low. If the viscosity is very low, for example in order of 1 mPas, simple o-ring seals have to be abandoned in hydraulic equipment and other more expensive options must be used. The low viscosity of metal cutting fluid will cause weakening of the metal surface quality in case of metal cutting. Bio oils and mineral oils are very sensitive to moisture (typically maximum ca. 0.1 wt-%) and high temperatures. Oils are not water soluble, thus water containing acidic and corrosive compounds from oil will concentrate at the bottom of equipment and cause extremely corrosive environment. Separate phases of oil and water will cause pumping problems also. High temperatures will cause danger for fire.

Alkali and alkali-earth metal salts of carboxylic acid such as potassium formate, sodium formate, potassium acetate and sodium acetate have found increasing use in the area of heat transfer and power transfer (hydraulic) and deicing mainly due to their low environment impact and low viscosity at minus temperatures. When using these formate and acetate based alkali and alkali-earth metal salts as heat transfer fluids, they can operate even at −40° C. without noticeable increase in the pumping costs. Corrosion is the drawback of these fluids. High electrical conductivity, over 200 mS/cm, and the tendency to form precipitates are the main reasons for the increased corrosion. Besides corrosion, the alkali and alkali-earth metal salts of carboxylic acid are prone to salting out and precipitate formation. Salt crystals formed at the cleavage of the pumps, on the inner surfaces of the nozzles may cause the whole heat transfer, hydraulic system or $NO_x$ catalyst system to collapse. Pumps start leaking or the nozzles simply clog and thus the fluid cannot pass through. And, the corrosion underneath the crystal precipitates is very severe.

The deicing and anti-icing fluids and these fluid containing compositions, which are used in the airports, have been traditionally formulated from ethylene glycol, propylene glycol, and urea. Ethylene glycols are toxic and thus require expensive treatment and disposal. More safer fluid such as propylene glycol and urea biodegrade too rapidly imposing excess oxygen demand on the environment or the sewage treatment plant. As a consequence, airports were forced to switch to deicers such as compositions comprising fluids based on potassium formate and potassium acetate to reduce biological and chemical oxygen demand. However, a number of airports and air line companies have reported severe corrosion problems with these compositions. Catalytic oxidation (corrosion) of aircraft carboncarbon composite brakes resulting from potassium formate and potassium acetate has become a major safety issue. Existing literature data has demonstrated that potassium, sodium, and calcium cations are responsible for the catalytic oxidation of carbon, not the formate or acetate anion itself. Furthermore, because potassium formate and potassium acetate have high electrical conductivities and they are prone to salting out i.e. to the salt precipitation over the metal surfaces they have detrimental corrosion effects on electrical connections within the air plane e.g. in the metal plates such as cadmium plated landing gear parts. In 2005 when, when one European airport switched from products based on urea and ethylene glycol to potassium formate based products, corrosion of zinc coated steel occurred on flight structures, as well as on maintenance and ground operation vehicles [ACRP Synthesis, Impact of Airport Pavement Deicing Products on Aircraft and Airfield Infrastructure, 7.1.2009, ISSN 1935-9187, ISBN 978-0-309-09799-4, 2008 Transportation Research Board].

Moreover, the synergistic generation of residue when aircraft anti-icing composition or fluid based on glycols is splattered with potassium formate or acetate runaway deicing fluid presents serious concerns about residue gel hydration and refreezing in flight and has produced potential dangerous rough residues on leading edge surfaces on aircraft. This can negatively affect in-flight handling of the aircraft if deposits occur on or near control surfaces or linkages. Initial research has shown that the thickener used in the aircraft deicer fluids will separate due to the contact with potassium formate or potassium acetate based runaway deicing fluids. [Hille, J., "Deicing and Anti-icing Fluid Residues," Boeing Aero Magazine, 1$^{st}$ quarter, 2007, pp. 15-21].

In spite of the environmental advantages over the formulae such as urea and glycols, alkali-metal-salt based runaway deicer compositions such as compositions based on potassium formate and potassium acetate present potential problems both in deicing airplanes or airfield infrastructures and also in using to heat transfer as well.

Heat storage chemicals are typically based on hydrated fluoride-, chloride-, sulfate-, and nitrate salts or salt combination. These salts are quite harmful to environment and corrosive especially to light metals such as aluminum and magnesium used in modern auto industry or heat storage plants (e.g. solar heating and electrical heating on low tariff hours) that are areas that can benefits from non corrosive heat storage chemicals.

Other prior art freezing point depressants, such as ethanol and methanol, have toxic effects and high volatility. They are also a cause of offensive smell and fire danger.

U.S. Pat. No. 6,835,323 discloses an alkali metal, an alkaline-earth metal salt or an ammonium salt of formic acid for the device which hydrostatically transmit power.

U.S. Pat. No. 7,201,982 relates to a method for cooling an electrical system comprising circulating in a cooling system of the electrical system a mixture comprising a heat transfer fluid and one or more carboxylic acid salts thereof. The carboxylic aid is $C_5$-$C_{18}$ mono or di-carboxylic acid. The carboxylic acid salt (0.001 to 10 wt-%) is dissolved in a water soluble liquid alcohol freezing point depressant such as glycol (90 to 99 wt-%).

U.S. Pat. No. 7,306,750 describes the application of one or a mixture of anhydrous salts, selected from the group consisting of the alkali metal salts, alkali-earth metals salts, amine salts and ammonium salts of $C_3$-$C_{18}$ mono or di-carboxylic acid for storing the thermal energy where in the temperature range of the thermal energy source is 20 to 180° C.

WO patent 2005/042662 discloses the process for producing a deicing/anti-icing fluid that produces monoalkyl esters of long chain fatty acids. The stream includes water, glycerol, and an alkali containing compounds.

US patent 2003/0015685 discloses low corrosive potassium acetate deicing and anti-icing compositions based on the use of $C_3$-$C_{16}$ aliphatic monobasic acid or the alkali metal, ammonium or amine salt of monobasic acid as a corrosion inhibitor.

U.S. Pat. No. 7,452,480 relates to carboxylate salts of amines that are used as components of heat exchange fluids. Fluid contains amine carboxylates, preferably triethanolamine formate from 15 to 80 wt-%, and potassium formate up to 50 wt-%.

It would be represent a notable advance in the state of art if one could develop a freezing point depressant which is environmentally benign, but in spite of that biostatic also, non-corrosive and practically immune to salting out and to precipitate formation.

The ideal freezing point depressant composition for airfield pavement deicing, aircraft deicing and anti-icing, heat storage and heat transfer, metal cutting, NOx removal and hydraulic fluid use:
  should be free of corrosive halides such as chlorides,
  should be free of alkali and alkali-earth metals such as potassium, sodium and calcium,
  should not form precipitates on metal surfaces,
  should have low toxicity,
  should have relatively low biological (BOD) and chemical oxygen demand (COD),
  should have reduced electrical conductivity, most preferably below 100 mS/cm,
  should be inexpensive to obtain,
  and naturally should be effective at low temperatures, i.e. it should have low viscosity and low freezing point, as well as high specific heat capacity and thermal conductivity.

GENERAL DESCRIPTION OF THE INVENTION

The present inventors have surprisingly found that ideal freezing point depressant compositions comprise a liquid or water-soluble organic ammonium carboxylate having the formula (1):

$$[NR^1R^2R^3R^4]^+{}_n[R^5(COO)_n]^{-n} \qquad (1),$$

in which $R^1$, $R^2$, and $R^3$ are selected from the group comprising hydrogen, substituted and unsubstituted alkyls containing 1-6 carbon atoms, $R^4$ is a substituted or unsubstituted alkyl containing 1-6 carbon atoms, $R^5$ is hydrogen, a substituted or unsubstituted hydrocarbon containing 1-6 carbon atoms and n is an integral 1-6. Organic ammonium carboxylate stands for a salt or a complex formed of an ammonium cation and a carboxylic anion. Hence one or more ammonium ions of the salt or complex may be primary ($RNH_3^+$), secondary ($R_2NH_2^+$), tertiary ($R_3NH^+$) or quaternary ($R_4N^+$). The carboxylate ion of the salt or complex may be monovalent ($RCOO^-$) or polyvalent ($R(COO^-)_{n>1}$), and in that case it may also comprise unneutralised carboxyl groups (—COOH). In the latter case, $R^5$ is defined as being substituted with carboxyl.

Group $R^5$ in formula (1) is preferably hydrogen, substituted alkyl containing 1-6 carbon atoms or unsubstituted alkyl containing 1-6 carbon atoms, more advantageously hydrogen, and substituted alkyl containing 14 carbon atoms or unsubstituted alkyl containing 1-4 carbon atoms. The terms "substituted" and "unsubstituted" refer basically to groups containing heteroatoms. Preferable these groups contain as a heteroatom oxygen or nitrogen (e.g. —OH, —NH$_2$, —COOH).

Since the group $R^5$ is associated with a carboxylate group, the ammonium carboxylate of formula (1) is preferably based on a lower organic carboxylic acid and it can be prepared from such an acid or its salt. Lower organic acids include lower fatty acids such as formic acid, acetic acid, propionic acid, n- and i-butyric acid, and n- and i-pentanic acid. Useful acids also include benzoic acid and oxycarboxylic acids such as glycolic acid and lactic acid. Lower dicarboxylic acids such as oxalic acid, malonic acid, succinic acid and glutaric acid are also applicable.

Group $R^5$ of formula (1) is most advantageously hydrogen, methyl or ethyl. In formula (1), n is preferably 1 or 2, most advantageously 1. Consequently, the most advantageous organic ammonium carboxylate used in the method of the invention is based on lower fatty acids.

As mentioned above, the ammonium ion of formula (1) may be primary ($RNH_3^+$), secondary ($R_2NH_2^+$), tertiary ($R_3NH^+$) or quaternary ($R_4N^+$), and then R is typically a substituted or unsubstituted alkyl containing 1-6 carbon atoms. Typical ammonium ions containing unsubstituted alkyls have been formed from water-soluble amines such as methylamine (g), dimethylamine, trimethylamine, ethylamine, diethylamine, etc.

Ammonium ions containing substituted alkyls have typically been formed from water-soluble amines, whose alkyl(s) have been substituted with one or more hydroxyl groups. In formula (1), $R_1$ is preferably hydrogen and $R_2$ and $R_3$ have preferably been selected from the group comprising hydrogen and $C_1$-$C_6$-alkyls substituted with a hydroxyl group, preferably from the group comprising hydrogen and $C_1$-$C_4$-alkyls substituted with a hydroxyl group. $R_4$ is preferably a $C_1$-$C_6$-alkyl substituted with a hydroxyl group, most advantageously a $C_1$-$C_4$-alkyl substituted with a hydroxyl group.

Organic ammonium carboxylates formed of lower alkanolamines are hence particularly useful. Among lower alkanolamines we may cite monoethanolamine, diethanolamine, triethanolamine, monoisopropanolamine, di-isopropanolamine, triisopropanolamine, mono-sek-butanolamine, di-sek-butanolamine and tri-sek-butanolamine.

One important group of useful alkanolamines comprises lower alkyl alkanolamines, such as methyl ethanolamine, dimethylethanolamine, diethylethanolamine, butylethanolamine, methyldiethanolamine and ethyldiethanolamine. Additional information about useful alkanolamines can be found in the book KirkOthmer, Encyclopedia of Chemical Technology 3rd Ed., Vol. 1, p. 944, which is incorporated in this disclosure.

It is particularly recommendable that $R_1$ is hydrogen, $R_2$ and $R_3$ are selected from the group comprising of hydrogen and ethyl substituted with a hydroxyl group, preferably from the group comprising of hydrogen and 2-hydroxy ethyl, and $R_4$ is ethyl substituted with a hydroxyl group, preferably 2-hydroxy ethyl. Consequently, the ammonium carboxylate in accordance with the invention is preferably based on ordinary mono, di or triethanolamine.

In the most advantageous embodiment, the organic ammonium carboxylate of formula (I) is selected from the group comprising of a salt or a complex of formic acid and/or lactic acid and monoethanolamine and/or triethanolamine preferably in the weight ratio 80:20-20:80.

In the practice, ammonium carboxylate of formula (1) is prepared e.g. by mixing an ammonium cation source and a carboxyl anion source in the desired molar ratio, either without a medium or by using an appropriate solvent such as water as a medium. When the starting materials are an amine and an acid, they are simply mixed during gentle heating, if necessary. When the starting materials consist of salts, they are typically dissolved separately in water, and then the solutions are combined. If a salt or a complex thus formed is hydrophobic, it will separate from the water phase as an unctuous or paste-like deposit or a wax-like precipitate, and it can be separated from the water phase by any known methods. When both the starting materials and the formed product are hydrophobic, the preparation can be carried out in an organic solvent instead of water. The freezing point depressant composition used in the invention comprises either fluid composing of ammonium carboxylate of formula (1) without solvent or ammonium carboxylate of formula (1) with appropriate solvent. Preferably solvent is an aqueous solution or a dispersion. Chemical stability: Preliminary results indicate that for instance a fluid pair: ethylene amide—formic acid could under special circumstances react and form amid when no solvent is present. Increasing the temperature favours amid formation. Nearly no esters are formed.

The organic ammonium carboxylates of formula (1) as well as compositions and fluids obtained from these carboxylates protect wood material against micro-organisms. We refer here for PCT FI20006-00007 for Granula ltd, where we have demonstrated efficiency of ammonium carboxylates of formula (I) against micro-organisms including several fungi.

To be exact the invention relates the method defined in claim 1 and use defined in claim 12. In the method according to invention a composition with low corrosive effect and low freezing point is prepared by mixing an ammonium cation source with a carboxyl anion source in an appropriate molar or weight ratio, either without a medium or by using an appropriate medium for obtaining liquid or water-soluble organic ammonium carboxylate of formula (1):

$$[NR^1R^2R^3R^4]^+{}_n[R^5(COO)_n]^{-n}, \qquad (1),$$

in which $R^1$, $R^2$, and $R^3$ are selected from the group comprising hydrogen, substituted and unsubstituted alkyls containing 1-6 carbon atoms, $R^4$ is a substituted or unsubstituted alkyl containing 1-6 carbon atoms, $R^5$ is hydrogen, a substituted or unsubstituted hydrocarbon containing 1-6 carbon atoms and n is an integral 1-6 and thereafter adding possible solvent and at the same time keeping alkali or alkali-earth metal content of the composition in a range of 0.001-30 wt-%, preferably in a range of 0.001-30 wt-% and most preferably in a range of 0.001-1.0 wt-% and halide content in a range of 0.001-1 wt-% most preferably in a range of 0.001-0.1 wt-%.

The use according to invention relates using the composition comprising liquid or water-soluble organic ammonium carboxylate of formula (1):

$$[NR^1R^2R^3R^4]^+{}_n[R^5(COO)_n]^{-n}, \qquad (1),$$

in which $R^1$, $R^2$, and $R^3$ are selected from the group comprising hydrogen, substituted and unsubstituted alkyls containing 1-6 carbon atoms, $R^4$ is a substituted or unsubstituted alkyl containing 1-6 carbon atoms, $R^5$ is hydrogen, a substituted or unsubstituted hydrocarbon containing 1-6 carbon atoms and n is an integral 1-6 either without a medium or by using an appropriate medium, as a freezing point depressant.

Compositions prepared according to the method of invention have a low freezing point, low corrosivity, high bacterial resistance and environmentally benign and safe to use.

The freezing point depressant composition used in the invention is typically in the form of an aqueous solution or dispersion containing 0.5-100% by weight of the ammonium carboxylate of formula (1), more advantageously 5-70% by weight. The fluid solutions in water could possess many of the desired properties. For example no ready made emulsions would be needed.

The freezing point depressant composition containing ammonium carboxylate of formula (1) either without a medium or by using an appropriate solvent together with auxiliary substances and possible compatible carboxylates are selected so, that the composition:
  has a low freezing point themselves and will also lower freezing point of an aquous system in intended application,
  may include alkali or alkali-earth metals in amount of 0.001-30 wt-%, preferably 0.001-30 wt-% and most preferably 0.001-1.0 wt-% and
  may include halides in amount of 0.001-1 wt-% most preferably 0.001-0.1 wt-% and further
  compositions for deicing or anti-icing applications should have viscocity of 0.1-10,000 mpas and electrical conductivity of 1.0-100 mS/cm,
  compositions for heat transfer applications should have viscocity of 0.1-500 mpas and electrical conductivity of 1.0-100 mS/cm,
  compositions which are used as hydraulic fluids should have viscocity of 5.0-10,000 mpas and electrical conductivity of 1.0-100 mS/cm.
  grease-like compositions should have viscocity of 100-50,000 mpas and electrical conductivity of 0.05-100 mS/cm (for example metal cutting fluids).

Because metal corrosion is an electrochemical process, fluids of high conductivity may facilitate corrosion more than low conductivity fluids, and they can have additional detrimental effects on electrical connections within the light fixtures themselves. All compositions used in the invention have a low electrical conductivity (under 100 mS/cm) which lowers their corrosive influence. The low electrical conductivity (below 100 mS/cm) and the lack of halides, alkali and alkali-earth metals makes the fluid non corrosive and immune to precipitate formation. To further facilititate anti-corrrosive properties of the composition comprising fluid according to formula (I) and possible solvent, it may be advantageous to strip oxygen from composition by flowing gas (for example nitrogen) through the liquid composition.

Preferably compositions do not contain environmentally questionable chemicals such as oils and are safe to handle also.

The freezing point depressant composition intended for deicing or anti-icing applications, contains preferably 40-60% by weight of ammonium carboxylate of formula (1), most preferably 45-55% by weight. When using a composition for these applications the good properties would be anti freezing, appropriate heat capacity and heat transfer properties, environmental friendliness, anti microbial activity, anti corrosion activity, low evaporation, etc. Some amid formation in the fluid formulation could be an advantage. Compared with other products no solid crystals are formed (here we refer for instance fluid ethylene amine—formic acid presented in table 2 below) no corrosion of carbon fiber brakes, environmental friendliness, economical and good properties against many micro-organisms (see above). One advantageous method of using composition targeted for deicing surfaces is to heat compositions prior use. Compositions can be heated by using conventional liquidheating-techniques or by pressing the composition through a microwave nozzle. A suitable composition for this kind of use may be the fluid according to formula I mixed with solvent comprising 1,3-propane diol. One important anti icing application is the prevention of ice formation onto an aircraft wings and onto an airstrip. Specially for anti icing of aircraft wings the composition should have suitable viscosity and surface tension. Viscocity should on the one hand be so high that it will prevent removal of composition from wings and on the other hand the surface tension should be such, that there is no bubble-formation from composition. One can vary the viscocity and surface tension of the freezing point depressant composition considerably, as can be seen example from tables 1-4, by using different quantities of solvent and by choosing appropriate fluid.

The freezing point depressant composition intended for heat transfer applications contains preferably 5-70% by weight of ammonium carboxylate of formula (1), most preferably 20-40% by weight. From a good heat transfer fluid one requires following properties: a good heat capacity and heat transfer ability, lubrication, environmental friendliness, anti microbial activity, anti corrosiviness activity, low evaporation, etc. Some amid formation in the fluid formulation could also be of advantage. As stated above the compositions targeted to heat transfer applications have low elecrical connductivity, 0-100 mS/cm and they contains low level of halides and alkali or alkali-earth metals and therefore their corrosive influence are slight. These compositions fulfills also other requirements for a good heat transfer fluid, for example as to anti microbial activity (see discussion above). Heat capacities for fluids and diluted fluid solutions were found to be high enough for using these compositions as heat transfer fluids. When compared to other common heat transfer fluids one big advantage of using compositions according to invention is, that no solid crystals will be formed. Present heat transfer fluids are complex emulsions of special oils, water, corrosion inhibitors, amides, emulsifiers, anti microbial additives etc. There are many problems due to microbial contamination, evaporation of organics, stability etc.

The freezing point depressant composition to be used as a hydraulic fluid or metal cutting fluid contains preferably 5-70% by weight of ammonium carboxylate of formula (1), most preferably 20-70% by weight.

The freezing point depressant composition used in the invention as a grease preferably contains 70-100% by weight of ammonium carboxylate of formula (1), most preferably 80-100% by weight.

The freezing point depressant composition can be used as a freezing point additive for the urea and water or urea, water and ammonium formate based $NO_x$—removal-compositions. In this use the composition preferably contains 0.5-10% by weight of ammonium carboxylate of formula (1), most preferably 1-5% by weight.

The freezing point depressant composition is compatible with alkali metal, an alkali-earth metal or an ammonium salts of $C_1$-$C_6$ monocarboxylic acids or carboxylates of urea or ethylene glycol or propylene glycol, or glycerol or a mixture thereof and we include in the invention the combinations of the ammonium carboxylate of formula (1) with alkali metal, an alkaline earth metal or an ammonium salts of $C_1$-$C_6$ monocarboxylic acids or urea or ethylene glycol or propylene glycol, or glycerol or a mixture thereof carboxylates. By using freezing point depressant composition with urea for de-icing or anti icing applications one can lower oxygen demand on the environment or at the sewage treatment plant.

The freezing point depressant compositions containing ammonium carboxylate of formula (1) may contain auxiliary substances as well. Typical auxiliary substances comprise such as additional corrosion inhibitors, biocides, coloring agents, surfactants, and viscosity intensifiers.

Fluids prepared according to the method of the invention can also be substitutes for glycol ethers. Glycol ethers are a group of solvents based on alkyl ethers of ethylene glycol. Glycol ethers are commonly used in paints. These solvents typically have high boiling point, together with the favorable solvent properties of lower molecular weight ethers. Glycol ethers can be also derived of diethylene glycol. Acetates of glycols are a similar kind of potent solvents. Overexposure to glycol ethers can cause anemia (a shortage of red blood cells), intoxication similar to the effects of alcohol, and irritation of the eyes, nose, or skin. In laboratory animals, low-level exposure to certain glycol ethers can cause birth defects and can damage a male's sperm and testicles. By binding glycol ethers, fluids according to invention can be used in many application which require freezing point depression and at the same time also binding hazardous glycol ethers from environment.

One important aspect of the freezing point depressant composition is its reuse. The reuse of freezing point depressant composition is possible expecially when recovered from targets where this composition has been used as anti-icing or de-icing fluid or solution for melting ice away or preventing ice formation. This kind of application is for example anti-icing of wings, but also from other applications freezing point depressant can be recovered either in pure form or with some additional material such as dirt (for example when deicing or anti-icing of an airstrip). By purifying and reprocessing composition it can be reused in number of applications. Also without purifying the composition may be reused if it is collected as substantially pure or if the reuse target is such, that it do not require using pure composition. Exemplary applications are; as in additive for metal cutting or oil drilling fluids (0.5-30 wt-% if the oil drilling fluid is an alkal or an alkal-earth metal formiate or Ce-formiate), for controlling dust (that is dust binding, evaporation preventing, hygroscopicity control), reicing of ice tracks, esterification or etherification of material for energy production. One important application is to reuse freezing point depressant compositions for wood treatment; for this application we refer our PCT FI20006-00007 for Granula.

DESCRIPTION OF PREFERRED EMBODIMENTS OF THE INVENTION

The invention is described below in greater details with the help of examples. Person skilled in the art will recognize that the properties of the compositions studied are such that they will make ideal freezing point depressant fluid for application such as airfield pavement deicing, aircraft deicing and anti-icing, heat storage and heat transfer, metal cutting, $NO_x$ removal and hydraulic fluid uses.

In the following non-restricting examples we have presented some specific applications and properties of compositions (fluids and diluted solutions) prepared according to the method of invention as well as method(s) for preparation of these compositions (products). These examples are in no way intended to limit the compositions or their use.

Example 1

A deicing and an anti-icing fluid were prepared by mixing 1 mole of formic acid (99%) with 1 mole of monoethanolamine (99%). Distilled water was added to the fluid mixture in order to made 60% by weight solution in water.

The freezing point of the solution was below −20° C., the electrical conductivity of the fluid was 61 mS/cm at 26° C., and pH of the fluid was 7.55 (measured directly from the solution).

Example 2

A heat transfer fluid was prepared by mixing 1 mole of formic acid (99%) with 1 mole of monoethanolamine (99%). Distilled water was added to the fluid mixture in order to made 40% by weight solution in water.

The freezing point of the solution was below −20° C., the Brookfield DV-I viscosity (20 rpm) was 10 mPas at −20° C., 10 mPas at −10° C., 10 mPas at 0° C., and Bohlin VOR viscosity (shear rate 23.1 1/s) was 4 mPas at 10° C., 3 mPas at 20° C., 2 mPas at 40° C., and 1.5 mPas at 60° C. The electrical conductivity of the fluid was 65 mS/cm at 26° C., and pH of the fluid was 7.54 (measured directly from the solution).

Example 3

A hydraulic fluid was prepared by mixing 1 mole of acetic acid (99%) with 1 mole of monoethanolamine (99%). Distilled water was added to the fluid mixture in order to made 60% by weight solution in water.

The freezing point of the solution was below −20° C., the Brookfield DV-I viscosity (20 rpm) was 80 mPas at −20° C., 60 mPas at −10° C., 40 mPas at 0° C., and Bohlin VOR viscosity (shear rate 23.1 1/s) was 23 mPas at 10° C., 15 mPas at 20° C., 8 mPas at 40° C., and 5 mPas at 60° C. The electrical conductivity of the fluid was 25.9 mS/cm at 26° C., and pH of the fluid was 7.34 (measured directly from the solution).

Example 4

A metal cutting fluid was prepared by mixing 1 mole of lactic acid (99%) with 1 mole of monoethanolamine (99%). Distilled water was added to the fluid mixture in order to made 90% by weight solution in water.

The freezing point of the solution was below −20° C., the Brookfield DV-I viscosity (20 rpm) was 4000 mPas at −20° C., 2050 mPas at −10° C., 1970 mPas at 0° C., and Bohlin VOR viscosity (shear rate 23.1 1/s) was 511 mPas at 10° C., 250 mPas at 20° C., 73 mPas at 40° C., and 30 mPas at 60° C. The electrical conductivity of the fluid was 2.31 mS/cm at 23° C., and pH of the solution was 8.6 (measured directly from the solution).

Example 5

A metal cutting fluid concentrate (=fluid according to invention without water) could substantially reduce the logistic costs. Interest is specially in fluids which include the ethanolamine and lactic acid. Contact angle between formulate and metal should be further decreased. This can be made with a small addition of surfactant. From these metal cutting fluid is an example a highly effective grease product (e.g. for the surface protection at low temperatures) which is an example of the product or products of the invention has the following composition and properties.

A metal cutting fluid as a grease was prepared by mixing 1 mole of lactic acid (99%) with 1 mole of triethanolamine (99%). No distilled water was added to the mixture.

The grease was not frozen and clear (no crystals or precipitates) at −20° C., the Brookfield DV-I viscosity (20 rpm) was over 20,000 mPas at −20° C., over 20,000 mPas at −10° C., 24,300 mPas at 0° C., and Bohlin VOR viscosity (shear rate 23.1 1/s) was 10,760 mPas at 10° C., 3955 mPas at 20° C., 736 mPas at 40° C., and 240 mPas at 60° C. The electrical conductivity of the grease was 0.207 mS/cm at 25° C., and pH of the fluid was 7.33 (measured directly from the solution).

Fluids and solutions in examples 6-23 have been made in the same way as presented in examples 1-5, that is, by mixing 1 mole of an ammonium cation source and 1 mole of a carboxyl anion source (unless otherwise shown) together for obtaining a concentrated fluid and then adding distilled water to the concentrated fluid, for obtaining diluted solutions.

TABLE 1

In table 1 has been shown formation of possible precipitates from fluids and diluted solutions obtained from fluids. Temperature was 20-25° C.

| Code/ex | fluid | fluid Wt-% from solution | | | | | | | pH of 2% solution |
|---|---|---|---|---|---|---|---|---|---|
| | | 100 | 90 | 80 | 60 | 40 | 20 | 5 | |
| EAE/6 | ethanolamine/ acetic acid | Clear | Clear | Clear | Clear | Clear | Clear | Clear | 6.8 |
| EAMa/7 | ethanolamine/ lactic acid | Clear | Clear | Clear | Clear | Clear | Clear | Clear | |
| EAM/8 | ethanolamine/ formic acid | Clear | Clear | Clear | Clear | Clear | Clear | Clear | 3.7 |

TABLE 1-continued

In table 1 has been shown formation of possible precipitates from fluids and diluted solutions obtained from fluids.
Temperature was 20-25° C.

| | | fluid Wt-% from solution | | | | | | | pH of 2% solution |
|---|---|---|---|---|---|---|---|---|---|
| | | 100 | 90 | 80 | 60 | 40 | 20 | 5 | |
| EAP/9 | ethanolamine/ propionic acid | Clear | Clear | Clear | Clear | Clear | Clear | Clear | 7.1 |
| EAOx/10 | ethanolamine/ oxalic acid | White hard powder | | 30% clear* | 30% clear | 30% clear | Clear | Clear | 8.2 |
| EAF/11 | ethanolamine/H₃PO₄ (85%) | White powder | | 70% dissolved | Clear, dissolved | | | | 9.2 |
| EAGLIC-A/12 | ethanolamine/ glycolic acid | | | | | | | | |
| EAGLIC-B/13 | ethanolamine/ glycolic acid** | | | | | | | | |
| EAGNIC-A/14 | ethanolamine/ glyconic acid | | | | | | | | |
| EAGNIC-B/15 | ethanolamine/ glyconic acid** | | | | | | | | |
| EDAE/16 | ethylenediamine/ acetic acid | Hard presicipate | Hard presicipate | Clear | Clear | Clear | Clear | Clear | 7.8 |
| EDAMa/17 | ethylenediamine/ lactic acid | Clear | Clear | Clear | Clear | Clear | Clear | Clear | 6.5 |
| EDAM/18 | ethylenediamine/ formic acid | Presicipate | Presicipate | Clear | Clear | Clear | Clear | Clear | 6.1 |
| EDAP/19 | ethylenediamine/ propionic acid | Hard, crystalline | not done | Precisipate | Clear | Clear | Clear | Clear | 8.1 |
| TEAE/20 | triethanolamine/ acetic acid | Clear | slight turbidity | slight turbidity | slight turbidity | slight turbidity | slight turbidity | slight turbidity | 6.33 |
| TEAMa/21 | triathanolamine/ lactic acid | Clear | Clear | Clear | Clear | Clear | Clear | Clear | 7.2 |
| TEAM/22 | triethanolamine/ formic acid | Hard, crystalline | slight turbidity | slight turbidity | slight turbidity | slight turbidity | slight turbidity | slight turbidity | 6.2 |
| TEAP/23 | triethanolamine/ propionic acid | Clear | Clear | Clear | slight turbidity | slight turbidity | slight turbidity | slight turbidity | 6.6 |

*some crystallines after 1 month storage
**mixing 1 mole of cation source and 2 mole of anion source for obtaining concentrated fluid

TABLE 2

The fluid and solution samples from examples 6-23 were subjected to chilling to a temperature of +4° C.
and then to further cooling to a temperature of −20° C. In these temperatures the possible turbidity,
precisipation of these samples was observed.

| ex | Temperature +4 C. | 100 | 90 | 80 | 60 | 40 | 20 | 5 |
|---|---|---|---|---|---|---|---|---|
| 6 | ethanolamine/ acetic acid | Clear | Clear | Clear | Clear | Clear | Clear | Clear |
| 7 | ethanolamine/ lactic acid | Clear | Clear | Clear | Clear | Clear | Clear | Clear |
| 8 | ethanolamine/ formic acid | Clear | Clear | Clear | Clear | Clear | Clear | Clear |
| 9 | ethanolamine/ propionic acid | Clear | Clear | Clear | Clear | Clear | Clear | Clear |
| 10 | ethanolamine/ oxalic acid | | | as 30% solution precipitate | | | Clear | Clear |
| 11 | ethanolamine/ H3PO4 85% | | | | | | | |
| 12 | ethanolamine/ glycolic acid | | | | | | | |
| 13 | ethanolamine/ glycolic acid** | | | | | | | |
| 14 | ethanolamine/ glyconic acid | Clear | Clear | Clear | Clear | Clear | Clear | Clear |
| 15 | ethanolamine/ glyconic acid** | Clear | Clear | Clear | Clear | Clear | Clear | Clear |
| 16 | ethylenediamine/ acetic acid | *** | 1/1 precipitate | ½ precipitate | Clear | Clear | Clear | Clear |
| 17 | ethylenediamine/ lactic acid | Clear | Clear | Clear | Clear | Clear | Clear | Clear |
| 18 | ethylenediamine/ formic acid | *** | precipitate | Clear | Clear | Clear | Clear | Clear |
| 19 | ethylenediamine/ propionic acid | *** | *** | *** | precipitate | Clear | Clear | Clear |

TABLE 2-continued

The fluid and solution samples from examples 6-23 were subjected to chilling to a temperature of +4° C. and then to further cooling to a temperature of −20° C. In these temperatures the possible turbidity, precisipation of these samples was observed.

| | | | | | | | | |
|---|---|---|---|---|---|---|---|---|
| 20 | triethanolamine/ acetic acid | 1/1 precipitate | Clear | Clear | Clear | Clear | Clear | Clear |
| 21 | triathanolamine/ lactic acid | Clear | Clear | Clear | Clear | Clear | Clear | Clear |
| 22 | triethanolamine/ formic acid | *** | Hard | Clear | Clear | Clear | Clear | Clear |
| 23 | triethanolamine/ propionic acid | Clear | Clear | Clear | turbidity | turbidity | turbidity | turbidity |

| ex | Temperature −20° C. | 100 | 90 | 80 | 60 | 40 | 20 | 5 |
|---|---|---|---|---|---|---|---|---|
| 6 | ethanolamine/ acetic acid | Clear/liquid state | Clear/liquid state | Clear/liquid state | Clear/ liquid state | Clear/liquid state | frozen | frozen |
| 7 | ethanolamine/ lactic acid | Clear/ liquid state | Clear/ liquid state | Clear/liquid state | Clear/ iquid state | frozen | frozen | frozen |
| 8 | ethanolamine/ formic acid | Clear/ liquid state | Clear/ liquid state | Clear/liquid state | Clear/ liquid state | frozen | frozen | frozen |
| 9 | ethanolamine/ propionic acid | Clear/ liquid state | Clear/ liquid state | Clear/liquid state | Clear/ liquid state | Clear/ liquid state | frozen | frozen |
| 10 | ethanolamine/ oxalic acid | | | | | | | |
| 11 | ethanolamine/ H3PO4 85% | | | | | | | |
| 12 | ethanolamine/ glycolic acid | | | | | | | |
| 13 | ethanolamine/ glycolic acid** | | | | | | | |
| 14 | ethanolamine/ glyconic acid | Clear/ liquid | | frozen not hard | | | | |
| 15 | ethanolamine/ glyconic acid** | almost frozen | | frozen hard | | | | |
| 16 | ethylenediamine/ acetic acid | | | | | | | |
| 17 | ethylenediamine/ lactic acid | Clear/ liquid state | | | | frozen | frozen | frozen |
| 18 | ethylenediamine/ formic acid | *** | Precipitate | Clear/liquid state | | frozen | frozen | frozen |
| 19 | ethylenediamine/ propionic acid | *** | *** | *** | precipitate 30% frozen | frozen | frozen | frozen |
| 20 | triethanolamine/ acetic acid | Hard | Hard | Clear/liquid | Clear/liquid state | frozen | frozen | frozen |
| 21 | triathanolamine/ lactic acid | Clear/ liquid state | Clear/ liquid state | Clear/liquid state | Clear/ liquid state | frozen | frozen | frozen |
| 22 | triethanolamine/ formic acid | *** | Hard | Clear/liquid state | Clear/ liquid state | frozen | frozen | frozen |
| 23 | triethanolamine/ propionic acid | specific crystals | Hard | Liquid state | Liquid | frozen | frozen | frozen |

**1 mole of cation source and 2 mole of anion source

TABLE 3

In table 3 is shown electrical conductivity, surface tension and pH of fluid and solution samples for fluids and solutions of examples 6-23.

| Fluid | | diluted with water wt-% fluid from solution | | | | | | | pH 2%- solution |
|---|---|---|---|---|---|---|---|---|---|
| | | 100 | 90 | 80 | 60 | 40 | 20 | 5 | |
| ethanolamine/ acetic acid | Electrical conductivity mS/cm | 0.534 | 2.24 | 7.1 | 25.9 | 46.9 | 47.8 | 20.2 | 6.8 |
| | T ° C. | 25.4 | 25.9 | 26 | 25.6 | 25.4 | 25.1 | 24.9 | |
| | pH | 8.0 | 7.8 | 7.7 | 7.3 | 7.1 | 6.9 | 6.8 | |
| | surface tension dyn/cm | 52.0 | 56.0 | | | 52.0 | | 65.0 | |

TABLE 3-continued

In table 3 is shown electrical conductivity, surface tension and pH of fluid and solution samples for fluids and solutions of examples 6-23.

| Fluid | | diluted with water wt-% fluid from solution | | | | | | | pH 2%-solution |
|---|---|---|---|---|---|---|---|---|---|
| | | 100 | 90 | 80 | 60 | 40 | 20 | 5 | |
| ethanolamine/ lactic acid | Electrical conductivity mS/cm | 0.541 | 2.31 | 5.91 | 17.8 | 29.7 | 28.5 | 11.69 | 7.6 |
| | T ° C. | 22.7 | 22.5 | 22.4 | 22.2 | 22.1 | 22.1 | 22 | |
| | pH | 8.8 | 8.6 | 8.6 | 8.6 | 8.6 | 8.7 | 8.7 | |
| surface tension | dyn/cm | 56.0 | 58.0 | 59.0 | 59.0 | 57.0 | 51.0 | 60.1 | |
| ethanolamine/ formic acid | Electrical conductivity mS/cm | 15.9 | 27.3 | 40.4 | 61 | 65 | 46.9 | 16 | 3.7 |
| | T ° C. | 26.1 | 25.9 | 25.8 | 25.6 | 25.5 | 25.5 | 25.8 | |
| | pH | 4.0 | 3.9 | 3.8 | 3.6 | 3.5 | 3.4 | 3.5 | |
| surface tension | dyn/cm | 67.0 | 69.0 | 68.0 | 64.0 | 51.0 | 48.0 | 56.0 | |
| ethanolamine/ propionic acid | Electrical conductivity mS/cm | 0.378 | 1.98 | 5.42 | 18.4 | 33.4 | 35.6 | 15.9 | 7.1 |
| | T ° C. | 24.3 | 23.9 | 23.9 | 23.5 | 23.4 | 23.2 | 23.2 | |
| | pH | 8.4 | 8.2 | 8.0 | 7.7 | 7.4 | 7.2 | 7.1 | |
| surface tension | dyn/cm | hardened | 43.0 | | 51.0 | | 56.0 | 55.1 | |
| ethanolamine/ oxalic acid | Electrical conductivity mS/cm | | | | | 30% 69.8 | 63.6 | 22.5 | 8.2 |
| | T ° C. | | | | | 24.5 | 25 | 25 | |
| | pH | | | | | 8.5 | 8.5 | 8.2 | |
| surface tension | dyn/cm | | | | | | | | |
| ethanolamine/ H3PO4 85% | Electrical conductivity mS/cm | | | | | | | | 8.2 |
| | T ° C. | | | | | | | | |
| | pH | | | | | | | | |
| surface tension | dyn/cm | | | | | | | | |
| ethanolamine/ glycolic acid | Electrical conductivity mS/cm | | | | | | | | |
| | T ° C. | | | | | | | | |
| | pH | | 9.9 | | | | | | |
| ethanolamine/ glycolic acid** | Electrical conductivity mS/cm | | | | | | | | |
| | T ° C. | | | | | | | | |
| | pH | 4.7 | 4.5 | 4.4 | | | | | |
| ethanolamine/ glyconic acid | Electrical conductivity mS/cm | | | | | | | | |
| | T ° C. | | | | | | | | |
| | pH | 10.3 | 10.3 | 10.3 | | | | | |
| ethanolamine/ glyconic acid** | Electrical conductivity mS/cm | | | | | | | | |
| | T ° C. | | | | | | | | |
| | pH | 8.7 | 8.5 | 8.6 | | | | | |
| ethylenediamine/ acetic acid | Electrical conductivity mS/cm | HARD | 2.84 | 5.66 | 15.6 | 25.2 | 23.8 | 9.61 | 7.8 |
| | T ° C. | | 26.9 | 26.8 | 26.6 | 26.6 | 26.2 | 26.2 | |
| | pH | | 8.5 | 8.4 | 8.2 | 8.2 | 8.1 | 8.0 | |
| surface tension | dyn/cm | crystalline | crystalline | crystalline | 58.0 | 43.0 | | 48.0 | |
| ethylenediamine/ lactic acid | Electrical conductivity mS/cm | 0.218 | 1.246 | 4.77 | 19.9 | 37.3 | 38 | 16 | 6.5 |
| | T ° C. | 25.1 | 25.7 | 24.7 | 24.7 | 24.4 | 24.2 | 24.2 | |
| | pH | 8.0 | 7.9 | 7.7 | 7.5 | 7.4 | 7.3 | 7.0 | |
| surface tension | dyn/cm | 60.0 | | 62.0 | | | 58.0 | 61.0 | |
| ethylenediamine/ formic acid | Electrical conductivity mS/cm | solid* | 18.6 | 30.4 | 50.3 | 55.9 | 40.7 | 13.7 | 6.1 |
| | T ° C. | | 23 | 22.8 | 22.7 | 22.6 | 22.5 | 22.5 | |
| | pH | 7.2 | 7.0 | 6.9 | 6.6 | 6.5 | 6.4 | 6.2 | |
| surface tension | dyn/cm | | | 57.0 | 52.0 | | 65.0 | 47.0 | |
| ethylenediamine/ propionic acid | Electrical conductivity mS/cm | solid | ei lam. | 5.15 | 11.9 | 19.1 | 19.1 | 8.53 | 8.1 |
| | T ° C. | | | 25.8 | 25.8 | 25.6 | 25.5 | 25.8 | |
| | pH | | | 8.5 | 8.3 | 8.2 | 8.1 | 8.1 | |

TABLE 3-continued

In table 3 is shown electrical conductivity, surface tension and pH of fluid and solution samples for fluids and solutions of examples 6-23.

| Fluid | | diluted with water wt-% fluid from solution | | | | | | | pH 2%-solution |
|---|---|---|---|---|---|---|---|---|---|
| | | 100 | 90 | 80 | 60 | 40 | 20 | 5 | |
| surface tension triethanolamine/ acetic acid | dyn/cm Electrical conductivity mS/cm | crystalline 0.158 | crystalline 0.935 | crystalline 5.45 | crystalline 12.08 | 46.0 23.7 | 49.0 24.6 | 45.0 10.36 | 6.33 |
| | T ° C. | 26.5 | 26.1 | 25.9 | 25.8 | 25.6 | 25.7 | 25.5 | |
| | pH | 6.9 | 6.8 | 6.7 | 6.6 | 6.6 | 6.5 | 6.5 | |
| surface tension triathanolamine/ lactic acid | dyn/cm Electrical conductivity mS/cm | 47.0 0.207 | 0.934 | 36.0 3.46 | 10.16 | 17.4 | 34.0 17.1 | 45.0 6.73 | 7.2 |
| | T ° C. | 25.1 | 25.2 | 24.8 | 25 | 24.9 | 24.9 | 214.8 | |
| | pH | 7.3 | 7.2 | 7.2 | 7.2 | 7.2 | 7.2 | 7.2 | |
| surface tension triethanolamine/ formic acid | dyn/cm Electrical conductivity mS/cm | Hard, crystalline | 2.54 | 7.05 | 31.5 | 40.7 | 36.4 | 14.2 | 6.2 |
| | T ° C. | | 24.7 | 24.6 | 24.5 | 24.7 | 24.5 | 24.5 | |
| | pH | | 6.2 | 6.2 | 6.2 | 6.0 | 6.2 | 6.0 | |
| surface tension triethanolamine/ propionic acid | dyn/cm Electrical conductivity mS/cm | 0.24 | 0.868 | 2.25 | 6.52 | 17.6 | 19.4 | 8.53 | |
| | T ° C. | 24.7 | 24.6 | 24.6 | 24.5 | 24.4 | 24.3 | 24.3 | |
| | pH | 7.2 | 7.2 | 7.0 | 6.8 | 6.7 | 6.6 | 6.6 | |
| surface tension | dyn/cm | 42.0 | | 40.0 | | | 35.0 | | |

*liquide state
+60° C.
**1 mole of cation source and 2 mole of anion source

As can be seen from tables 1-3 fluids and diluted solutions down to 60 wt-% were almost all solutions in liquid state in −20° C. and thus have lowered freezing point compared to distilled water. These fluids and solutions have also low electrical conductivity (01-65 mS/cm). As can be seen from table 2 these fluids and diluted solutions thereof are nor prone for precipitating. Since the electrical conductivity is low for compositions according to examples 1-23 and they are not prone to presipitate these compositions will not cause a corrosive environment.

TABLE 4

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

| monoethanolamine/acetic acid | fluid Wt-% from solution | 100 | 90 | 80 | 60 | 40 | 20 | 5 |
|---|---|---|---|---|---|---|---|---|
| water | water wt-% | 0 | 10 | 20 | 40 | 60 | 80 | 95 |

| | ° C. | VISCOSITY mPas | | | Bohlin VOR viscosity Brookfield DV-I viscosity | | shear rate 23.1 1/s 20 rpm sp3 | |
|---|---|---|---|---|---|---|---|---|
| viscosity mPas/ | −20 (repeat) | >20000 | >20000 | 12450 | 170 | 35 | X | X |
| | −20 | >20000 | 16740 | 1700 | 80 | 20 | X | X |
| | −10 | >20000 | 5150 | 700 | 60 | 15 | 10 | 5 |
| | 0 | 27850 | 2160 | 330 | 40 | 10 | 10 | 5 |
| | 10 | 15250 | 1152 | 210 | 23 | 6 | 2 | 1.7 |
| | 20 | 5665 | 556 | 118 | 15 | 5 | 2 | 1.3 |
| | 40 | 1220 | 154 | 41 | 8 | 3 | 1.5 | 1.1 |
| | 60 | 345 | 63 | 20 | 5 | 2 | 1 | 0.7 |
| conductivity mS/cm | | 0.534 | 2.24 | 7.1 | 25.9 | 46.9 | 47.8 | 20.2 |
| T ° C. | | 25.4 | 25.9 | 26 | 25.6 | 25.4 | 25.1 | 24.9 |
| pH ° C. 22 | | 7.96 | 7.81 | 7.68 | 7.34 | 7.07 | 6.87 | 6.79 |
| REDOX | | +31 | +54 | +69 | +107 | +146 | +179 | +216 |

TABLE 4-continued

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

| Composition: | | | | | | | | |
|---|---|---|---|---|---|---|---|---|
| monoethanolamine/formic acid | fluid Wt-% from solution | 100 | 90 | 80 | 60 | 40 | 20 | 5 |
| water | water wt-% | 0 | 10 | 20 | 40 | 60 | 80 | 95 |

| | | pale oily light liquid °C. | VISCOSITY mPas | | | Bohlin VOR viscosity Brookfield DV-I viscosity | shear rate 23.1 1/s 20 rpm sp3 | |
|---|---|---|---|---|---|---|---|---|
| viscosity mPas/ | | −30 | | | | | | |
| | | −20 | 4350 | 680 | 230 | 30 | 10 | X | X |
| | | −10 | 2830 | 410 | 130 | 20 | 10 | 5 | X |
| | | 0 | 1335 | 240 | 75 | 15 | 10 | 5 | 5 |
| | | 10 | 646 | 123 | 41 | 9 | 4 | 2 | 1.5 |
| | | 20 | 325 | 72 | 26 | 6 | 3 | 1.7 | 1.2 |
| | | 40 | 119 | 31 | 13 | 4 | 2 | 1.2 | 0.95 |
| | | 60 | 47 | 17 | 7 | 3 | 1.5 | 1.1 | 0.9 |
| conductivity mS/cm | | | 15.9 | 27.3 | 40.4 | 61 | 65 | 46.9 | 16 |
| T °C. | | | 26.1 | 25.9 | 25.8 | 25.6 | 25.5 | 25.5 | 25.8 |
| pH/22° C. | | | 7.75 | 7.67 | 7.6 | 7.55 | 7.54 | 7.53 | 7.51 |
| REDOX potential | | | −321 | −244 | −164 | −110 | −75 | −48 | +4 |

| Composition: | | | | | | | | |
|---|---|---|---|---|---|---|---|---|
| monoethanolamine/lactic acid | | 100 | 90 | 80 | 60 | 40 | 20 | 5 |
| water | | 0 | 10 | 20 | 40 | 60 | 80 | 95 |

| | °C. | VISCOSITY mPas | | | Bohlin VOR viscosity Brookfield DV-I viscosity | | shear rate 23.1 1/s 20 rpm sp3 | |
|---|---|---|---|---|---|---|---|---|
| viscosity mPas/ | −30 | | | | | | | |
| | −20 | >20000 | 4000 | | | | | |
| | −10 | 24000 | 2050 | | | | | |
| | 0 | 15600 | 1970 | 470 | 60 | 20 | 12 | |
| | 10 | 4675 | 511 | 126 | 18.8 | 5.5 | 2.5 | 1.7 |
| | 20 | 1930 | 250 | 67 | 12.5 | 4 | 2 | 1.3 |
| | 40 | 420 | 73 | 25 | 7.1 | 2.4 | 1.4 | 1 |
| | 60 | 150 | 30 | 13 | 3.5 | 1.6 | 0.8 | 0.8 |
| conductivity mS/cm | | 0.541 | 2.31 | 5.91 | 17.8 | 29.7 | 28.5 | 11.69 |
| T °C. | | 22.7 | 22.5 | 22.4 | 22.2 | 22.1 | 22.1 | 22 |
| pH °C. 22 | | 8.75 | 8.6 | 8.59 | 8.59 | 8.56 | 8.65 | 8.66 |
| REDOX | | −31 | −20 | +9 | +33 | +50 | +70 | +103 |

| Composition: | | | | | | | | |
|---|---|---|---|---|---|---|---|---|
| Monoethanolamine/propionic acid | | 100 | 90 | 80 | 60 | 40 | 20 | 5 |
| water | | 0 | 10 | 20 | 40 | 60 | 80 | 95 |
| solid wax-like/crystalline | | | | | | | | |

| | °C. | EAP1-7 VISCOSITY mPas | | | Bohlin VOR viscosity Brookfield DV-I viscosity | | shear rate 23.1 1/s 20 rpm sp3 | |
|---|---|---|---|---|---|---|---|---|
| viscosity mPas/ | −30 | | | | | | | |
| | −20 | >200000 | 15200 | 2600 | 190 | 60 | X | X |
| | −10 | | | | | | | |
| | 0 | | | | | | | |
| | 10 | 6675 | 660 | 163 | 24 | 7 | 3 | 1.6 |
| | 20 | 2880 | 334 | 92 | 16 | 5 | 2.2 | 1.1 |
| | 40 | 725 | 108 | 37 | 8 | 3 | 1.4 | 0.9 |
| | 60 | 260 | 46 | 19 | 5 | 2 | 1.1 | 0.7 |

TABLE 4-continued

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

| | | | | | | | | |
|---|---|---|---|---|---|---|---|---|
| conductivity mS/cm | | 0.378 | 1.98 | 5.42 | 18.4 | 33.4 | 35.6 | 15.9 |
| T ° C. | | 24.3 | 23.9 | 23.9 | 23.5 | 23.4 | 23.2 | 23.2 |
| pH ° C. 24 | | 8.38 | 8.18 | 8.02 | 7.69 | 7.43 | 7.23 | 7.09 |
| REDOX | | hard | −21 | −1 | +50 | +96 | +128 | +175 |

Composition:

| | | | | | | | | |
|---|---|---|---|---|---|---|---|---|
| Monoethanolamine/glycolic acid | | 100 | 90 | 80 | 60 | 40 | 20 | 5 |
| water | | 0 | 10 | 20 | 40 | 60 | 80 | 95 |
| light yellow clear liquid | | | | | | | | |

| | ° C. | VISCOSITY mPas | | Bohlin VOR viscosity Brookfield DV-I viscosity | | shear rate 23.1 1/s | |
|---|---|---|---|---|---|---|---|
| viscosity mPas/ | −30 | | | | | | |
| | −20 | | | | | | |
| | −10 | | | | | | |
| | 0 | | | | | | |
| | 10 | 277 | | | | | |
| | 20 | 140 | | | | | |
| | 40 | 48 | | | | | |
| | 60 | 22 | | | | | |
| conductivity mS/cm | | | | | | | |
| T ° C. | | | | | | | |
| pH ° C. | | 9.9 | | | | | |
| REDOX | | −183 | | | | | |

Composition:

| | | | | | | | | |
|---|---|---|---|---|---|---|---|---|
| ethylendiamine/acetic acid | | 100 | 90 | 80 | 60 | 40 | 20 | 5 |
| water | | 0 | 10 | 20 | 40 | 60 | 80 | 95 |

| | ° C. | VISCOSITY mPas | | | Bohlin VOR viscosity Brookfield DV-I viscosity | | shear rate 23.1 1/s | 20 rpm sp3 |
|---|---|---|---|---|---|---|---|---|
| viscosity mPas/ | −30 | | | | | | | |
| | −20 | | | | | | | |
| | −10 | | | | | | | |
| | 0 | | | | | | | |
| | 10 | | | | | 19.2 | 7 | 2.5 | 1.6 |
| | 20 | hard | different | long | 13 | 5 | 2 | 1.3 |
| | 40 | wax | crystals | crystals | 6.5 | 3 | 1.4 | 0.9 |
| | 60 | | | | 5 | 2 | 1.3 | 0.85 |
| conductivity mS/cm | | hard | 2.84 | 5.66 | 15.6 | 25.2 | 23.8 | 9.61 |
| T ° C. | | | 26.9 | 26.8 | 26.6 | 26.6 | 26.2 | 26.2 |
| | | | porridge precipitated | | | | | |
| pH measurement: temperature same as in conductivity measurement | | | 8.52 | 8.36 | 8.23 | 8.16 | 8.09 | 7.98 |
| REDOX POTENTIAL | | | crystalline mush | sticky crystals | +5 | +42 | +63 | +90 |

Composition:

| | | | | | | | | |
|---|---|---|---|---|---|---|---|---|
| ethylendiamine/lactic acid | | 100 | 90 | 80 | 60 | 40 | 20 | 5 |
| water | | 0 | 10 | 20 | 40 | 60 | 80 | 95 |

TABLE 4-continued

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

|  | yellow oily liquid ° C. | VISCOSITY mPas |  | Bohlin VOR viscosity Brookfield DV-I viscosity |  | shear rate 23.1 1/s 20 rpm sp3 |  |
|---|---|---|---|---|---|---|---|
| viscosity mPas/ | −30 |  |  |  |  |  |  |
|  | −20 |  |  |  |  |  |  |
|  | −10 |  |  |  |  |  |  |
|  | 0 |  | 10300 | 910 | 60 | 24 |  |
|  | 10 | 74130 | 2647 | 308 | 26 | 6.4 | 2.6 | 1.8 |
|  | 20 | 18700 | 1013 | 151 | 16 | 4.6 | 2 | 1.4 |
|  | 40 | 2460 | 250 | 49 | 8 | 2.7 | 1.3 | 1.1 |
|  | 60 | 650 | 76 | 21 | 5 | 2 | 0.8 | 0.7 |
| conductivity mS/cm |  | 0.218 | 1.246 | 4.77 | 19.9 | 37.3 | 38 | 16 |
| T ° C. |  | 25.1 | 25.7 | 24.7 | 24.7 | 24.4 | 24.2 | 24.2 |
| pH ° C. 25 |  | 8.03 | 7.87 | 7.7 | 7.52 | 7.37 | 7.25 | 6.98 |
| REDOX |  | −23 | +1 | +6 | +32 | +48 | +62 | +59 |

Composition:

| ethylendiamine/formic acid |  | 100 | 90 | 80 | 60 | 40 | 20 | 5 |
|---|---|---|---|---|---|---|---|---|
| water |  | 0 | 10 | 20 | 40 | 60 | 80 | 95 |

|  | ° C. | VISCOSITY mPas |  | Bohlin VOR viscosity Brookfield DV-I viscosity |  | shear rate 23.1 1/s 20 rpm sp3 |  |
|---|---|---|---|---|---|---|---|
| viscosity mPas/ | −30 |  |  |  |  |  |  |  |
|  | −20 |  |  |  |  |  |  |  |
|  | −10 |  |  |  |  |  |  |  |
|  | 0 |  |  |  |  |  |  |  |
|  | 10 |  |  | 16 | 5.6 | 2.8 | 1.9 | 1.5 |
|  | 20 |  |  | 11 | 4.3 | 2.3 | 1.4 | 1.2 |
|  | 40 |  |  | 6 | 2.7 | 1.8 | 1 | 0.8 |
|  | 60 |  |  | 4 | 2 | 1.2 | 0.9 | 0.7 |
| conductivity mS/cm |  | solid* | 18.6 | 30.4 | 50.3 | 55.9 | 40.7 | 13.7 |
| T ° C. |  |  | 23 | 22.8 | 22.7 | 22.6 | 22.5 | 22.5 |
| pH ° C. 22 |  | 7.15 crystalline | 6.99 crystalline | 6.86 | 6.62 | 6.49 | 6.35 | 6.24 |
| *conductivity measurement can be done at about 60° C. |  |  |  |  |  |  |  |  |
| REDOX |  |  |  | −390 | −220 | −130 | −85 | −18 |

| ethylendiamine/propionic acid |  | 100 | 90 | 80 | 60 | 40 | 20 | 5 |
|---|---|---|---|---|---|---|---|---|
| water |  | 0 | 10 | 20 | 40 | 60 | 80 | 95 |

|  | ° C. | VISCOSITY mPas |  | Bohlin VOR viscosity Brookfield DV-I viscosity |  | shear rate 23.1 1/s 20 rpm sp3 |  |
|---|---|---|---|---|---|---|---|
| viscosity mPas/ | −30 |  |  |  |  |  |  |  |
|  | −20 |  |  |  |  |  |  |  |
|  | −10 |  |  |  |  |  |  |  |
|  | 0 |  |  |  |  |  |  |  |
|  | 10 |  |  |  | 21 | 7 | 3 | 1.6 |
|  | 20 |  | hard | ⅔ |  | 14 | 4.9 | 2 | 1.4 |
|  | 40 |  | crystalline | crystalline |  | 7 | 2.9 | 1.5 | 1 |
|  | 60 |  |  |  |  | 4 | 1.8 | 1.1 | 0.85 |
| conductivity mS/cm |  | solid | ei lam. | 5.15 | 11.9 | 19.1 | 19.1 | 8.53 |
| T ° C. |  |  |  | 25.8 (crystalline) | 25.8 | 25.6 | 25.5 | 25.8 |
| pH ° C. 25 |  |  |  | 8.52 plenty of precipitation | 8.32 | 8.17 | 8.08 | 7.97 |
| REDOX |  |  |  | crystals | −23 | −2 | +27 |  |

TABLE 4-continued

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

Composition:

| triethanolamine/acetic acid | | 100 | 90 | 80 | 60 | 40 | 20 | 5 |
|---|---|---|---|---|---|---|---|---|
| water | | 0 | 10 | 20 | 40 | 60 | 80 | 95 |

| | °C. | VISCOSITY mPas | | | Bohlin VOR viscosity Brookfield DV-I viscosity | | shear rate 23.1 1/s | |
|---|---|---|---|---|---|---|---|---|
| viscosity mPas/ | −30 | | | | | | | |
| | −20 | | | | | | | |
| | −10 | | | | | | | |
| | 0 | crystallized | 41900 | 260 | 65 | 22 | 12 | crystals formed |
| | 10 | 15090 | 1810 | 104 | 28 | 6.4 | 2.6 | 1.6 |
| | 20 | 5252 | 759 | 58 | 18 | 4.6 | 2 | 1.3 |
| | 40 | 1060 | 191 | 23 | 9 | 2.8 | 1.4 | 0.9 |
| | 60 | 230 | 62 | 12 | 5 | 1.9 | 1.1 | 0.9 |
| conductivity mS/cm | | 0.158 | 0.935 | 5.45 | 12.08 | 23.7 | 24.6 | 10.36 |
| T ° C. | | 26.5 | 26.1 | 25.9 | 25.8 | 25.6 | 25.7 | 25.5 |
| pH temperature in measurement same as in conductivity measurement | | 6.91 | 6.81 | 6.71 | 6.63 | 6.55 | 6.49 | 6.46 |
| REDOX | | −58 | −49 | −21 | +7 | +41 | +66 | +96 |

Composition:

| triethanolamine/lactic acid | | 100 | 90 | 80 | 60 | 40 | 20 | 5 |
|---|---|---|---|---|---|---|---|---|
| water | | 0 | 10 | 20 | 40 | 60 | 80 | 95 |

| | °C. | VISCOSITY mPas | | | Bohlin VOR viscosity Brookfield DV-I viscosity | | shear rate 23.1 1/s | 20 rpm sp3 |
|---|---|---|---|---|---|---|---|---|
| viscosity mPas/ | −30 | | | | | | | |
| | −20 | >20000 | 19800 | | | | | |
| | −10 | >20000 | 5050 | | | | | |
| | 0 | 24300 | 1950 | | | | | |
| | 10 | 10760 | 1067 | 228 | 21.1 | 5.7 | 2.5 | 1.7 |
| | 20 | 3955 | 452 | 120 | 13.7 | 4.4 | 2 | 1.4 |
| | 40 | 736 | 119 | 41 | 7.2 | 2.4 | 1.4 | 0.9 |
| | 60 | 240 | 45 | 19 | 4.3 | 1.7 | 1 | 0.9 |
| conductivity mS/cm | | 0.207 | 0.934 | 3.46 | 10.16 | 17.4 | 17.1 | 6.73 |
| T ° C. | | 25.1 | 25.2 | 24.8 | 25 | 24.9 | 24.9 | 24.8 |
| pH temperature in measurement same as in conductivity measurements | | 7.33 | 7.22 | 7.17 | 7.17 | 7.18 | 7.21 | 7.22 |
| REDOX | | −97 | −121 | −115 | −33 | +9 | +39 | +63 |

Composition::

| triethanolamine/formic acid | | 100 | 90 | 80 | 60 | 40 | 20 | 5 |
|---|---|---|---|---|---|---|---|---|
| water | | 0 | 10 | 20 | 40 | 60 | 80 | 95 |

| | °C. | mPas | | | Bohlin VOR viscosity Brookfield DV-I viscosity | | shear rate 23.1 1/s 20 rpm sp3 | |
|---|---|---|---|---|---|---|---|---|
| viscosity mPas/ | −30 | | | | | | | |
| | −20 | | | | | | | |
| | −10 | | | | | | | |
| | 0 | | | | | | | |
| | 10 | hard | 558 | 138 | 9.3 | 4.5 | 2.3 | 1.6 |
| | 20 | hard | 296 | 80 | 6.8 | 3.5 | 1.8 | 1.3 |

TABLE 4-continued

In table 4 has been given results from viscosity measurements compositions of examples 6-23. Viscocity was measured with Bohlin method (bold numbers) at shear rate 23.1 1/s and with Brookefield method (normal numbers) at shear rate 20 rpm. Additionally electrical conductivity, ph and redox potential was measured for these compositions comprising fluids and solutions prepared from these fluids by adding distilled water.

|  |  |  |  |  |  |  |  |  |
|---|---|---|---|---|---|---|---|---|
|  | 40 |  | 94 | 33 | 4 | 2.2 | 1.3 | 0.9 |
|  | 60 |  | 42 | 17 | 2.6 | 1.8 | 1.1 | 0.7 |
|  |  | Hard crystalline |  |  |  |  |  |  |
| conductivity mS/cm |  |  | 2.54 | 7.05 | 31.5 | 40.7 | 36.4 | 14.2 |
| T ° C. |  |  | 24.7 | 24.6 | 24.5 | 24.7 | 24.5 | 24.5 |
| pH temperature in measurement same as in conductivity measurements |  |  | 6.23 | 6.19 | 6.16 | 5.95 | 6.19 | 6 |
| REDOX |  | ½ crystallized | −410 | −231 | −170 | −102 | −24 |  |

Composition::

| | | | | | | | |
|---|---|---|---|---|---|---|---|
| triethanolamine/propionic acid | 100 | 90 | 80 | 60 | 40 | 20 | 5 |
| water | 0 | 10 | 20 | 40 | 60 | 80 | 95 |

|  | ° C. | VISCOSITY mPas |  |  | Bohlin VOR viscosity Brookfield DV-I viscosity | shear rate 23.1 1/s | 20 rpm sp3 |
|---|---|---|---|---|---|---|---|
| viscosity mPas/ | −30 |  |  |  |  |  |  |
|  | −20 |  |  |  |  |  |  |
|  | −10 |  |  |  |  |  |  |
|  | 0 | 15000 | 2930 | 620 | 70 | 20 | 12 | froze |
|  | 10 | 5941 | 960 | 262 | 34 | 7.4 | 2.8 | 1.6 |
|  | 20 | 2150 | 485 | 134 | 21 | 5.4 | 2.1 | 1.3 |
|  | 40 | 490 | 120 | 45 | 10.4 | 3 | 1.5 | 0.9 |
|  | 60 | 145 | 44 | 20 | 6.5 | 2 | 0.8 | 0.7 |
| conductivity mS/cm |  | 0.24 | 0.868 | 2.25 | 6.52 | 17.6 | 19.4 | 8.53 |
| T ° C. |  | 24.7 | 24.6 | 24.6 | 24.5 | 24.4 | 24.3 | 24.3 |
| pH temperature in measurement same as in conductivity measurements |  | 7.22 | 7.23 | 6.99 | 6.81 | 6.7 | 6.62 | 6.56 |
| REDOX |  | −117 | −104 | −140 | −60 | −11 | +26 | +73 |

As can be seen from table 4 the viscosity of compositions varies considerably depending on the quality of the fluid in a composition and fluid - solvent proportion (w/w). For example instead of using formic acid and monoethanolamine (at lest 40 wt-% aquous solvent) as demonstrated in example 2 one could also use monoethanolamine and acetic acid (at least 40 wt-% aquous solvent) or monoethanolamine and lactic acid (at least 20 wt-% aquous solvent) as an heat transfer composition. No solid crystals will be formed for instance if one uses combination ethanol amine/formic acid as a heat transfer fluid (compare table 2 above). Avoiding solid crystals is also a beneficial property for instance for an anti-freezing and a de-icing fluid. Heat capacities for fluids and diluted fluid solutions in examples 1-23 were found to be between (2100-2500) J/kgK. As can be seen from table 4 their REDOX potential varied from ca −300 mV to +200 mV depending on fluid and water content of a composition. This gives interesting possibilities to choose pH and redox potential. Some specific properties like heat transfer, anti corrosion, anti microbial activity, wetting, contact angle, power to disperse, chemical stability should be assessed for the final formulations.

The invention claimed is:

1. A method of deicing a surface or preventing ice formation comprising:
providing a composition comprising a liquid or a water-soluble organic ammonium carboxylate of formula (1) in distilled water:

[NR¹R²R³R⁴]⁺ₙ[R⁵(COO)ₙ]⁻ⁿ,    (1), 

in which:
R¹, R², and R³ are selected from the group consisting of hydrogen, $C_1$-$C_4$-alkyls substituted with a hydroxyl group, and unsubstituted $C_1$-$C_4$-alkyls,
R⁴ is a $C_1$-$C_6$-alkyl substituted with a hydroxyl group or an unsubstituted $C_1$-$C_6$-alkyl,
R⁵ is selected from the group consisting of hydrogen substituted or unsubstituted methyl, and substituted or unsubstituted ethyl, and
n is 1 or 2, provided that when R₅ is hydrogen, NR₁R₂R₃R₄ is not triethanolamine; and
wherein the composition has electrical conductivity of 0.05-100 mS/cm, a freezing point lower than distilled water and a viscosity of 0.1-50,000 mPas and alkali metal or alkali earth metal concentration in the composition is in a range of 0.001-1.0 wt %; and
applying the composition to the surface for deicing or preventing ice formation on said surface.

2. The method according to claim 1, wherein n is 1.

3. The method according to claim 2, wherein R⁵ is selected from the group consisting of hydrogen, methyl and ethyl.

4. The method according to claim 3, wherein R¹, R² and R³ are selected from the group consisting of $C_1$-$C_4$-alkyls and R⁴ is a $C_1$-$C_6$-alkyl substituted with a hydroxyl group.

5. The method according to claim 3, wherein R¹ is hydrogen, R² and R³ are selected from the group consisting of hydrogen and $C_1$-$C_4$-alkyls substituted with a hydroxyl group, and R⁴ is a $C_1$-$C_6$-alkyl substituted with a hydroxyl group.

6. The method according to claim 5, wherein R² and R³ are selected from the group consisting of hydrogen and ethyl substituted with a hydroxyl group, and R⁴ is an ethyl substituted with a hydroxyl group.

7. The method according to claim 6, wherein R² and R³ are independently selected from the group consisting of hydrogen and 2-hydroxyethyl, and R⁴ is 2-hydroxyethyl.

8. The method according to claim 1, wherein the organic ammonium carboxylate of formula (1) is a mixture of (i) a salt of formic acid, acetic acid or lactic acid and (ii) monoethanolamine.

9. The method according to claim 8, wherein the salt and the monoethanolamine are present in a weight ratio of 80:20-20:80.

10. The method according to claim 1, wherein the organic ammonium carboxylate of formula (1) and the distilled water weight ratio in the composition is in a range 1:20-20:1.

11. The method according to claim 10, wherein the ratio is 1:6-1:1.

12. The method according to claim 1, wherein, the composition further comprises 5 to 97.5 wt % of a compound selected from the group consisting of an ammonium salt of $C_1$-$C_6$ monocarboxylic acids, urea, ethylene glycol, propylene glycol, glycerol and a mixture thereof.

13. The method according to claim 1, wherein the composition further comprises auxiliary substances in an amount of 0.001 to 10 wt %, said auxiliary substances being selected from the group consisting of corrosion inhibitors, biocides, coloring agents, surfactants, viscosity intensifiers, and mixtures thereof.

14. The method according to claim 13, wherein the auxiliary substance is corrosion inhibitor and the corrosion inhibitor is octanoic acid.

15. The method according to claim 1, wherein, the surface is an airfield pavement or aircraft surface.

16. The method according to claim 1, further comprising recovering and reusing said composition at least once after it has been applied to the surface.

17. The method in according to claim 1, wherein the composition is prepared by mixing, an ammonium cation source with a carboxyl anion source.

18. The method according to claim 1, wherein the composition has a redox potential from −300 mV to +200 mV.

* * * * *